United States Patent
Cai et al.

(10) Patent No.: US 11,885,666 B2
(45) Date of Patent: Jan. 30, 2024

(54) LINEAR COMPENSATION APPARATUS AND WEIGHING SYSTEM FOR ACCURATE WEIGHING AND MEASUREMENT OF FINE MATERIALS

(71) Applicants: Mettler-Toledo (Changzhou) Precision Instruments Co., Ltd, Changzhou (CN); Mettler-Toledo (Changzhou) Measurement Technology Co., Ltd, Changzhou (CN); Mettler-Toledo International Trading (Shanghai) Co., Ltd, Shanghai (CN)

(72) Inventors: Jinjie Cai, Changzhou (CN); Xiang Li, Changzhou (CN); Zhihe Chao, Changzhou (CN); Chenggang Ding, Changzhou (CN); Xiaomin Zhang, Changzhou (CN); Chunhui Li, Changzhou (CN)

(73) Assignees: Mettler-Toledo (Changzhou) Precision Instruments Co., Ltd, Changzhou (CN); Mettler-Toledo (Changzhou) Measurement Technology Co., Ltd, Changzhou (CN); Mettler-Toledo International Trading (Shanghai) Co., Ltd, Shanghai (CN)

(*) Notice: Subject to any disclaimer, the term of this patent is extended or adjusted under 35 U.S.C. 154(b) by 343 days.

(21) Appl. No.: 17/446,788

(22) Filed: Sep. 2, 2021

(65) Prior Publication Data
US 2022/0074787 A1 Mar. 10, 2022

(30) Foreign Application Priority Data
Sep. 4, 2020 (CN) .......................... 202010923694.1

(51) Int. Cl.
*G01G 23/01* (2006.01)
*G01G 21/23* (2006.01)
*G01G 23/04* (2006.01)

(52) U.S. Cl.
CPC ........... *G01G 21/23* (2013.01); *G01G 23/012* (2013.01); *G01G 23/04* (2013.01)

(58) Field of Classification Search
CPC ...... G01G 23/012; G01G 23/04; G01G 21/23; G01G 23/01
See application file for complete search history.

(56) References Cited

U.S. PATENT DOCUMENTS 4,156,361 A * 5/1979 Melcher ............... G01G 23/012
73/1.13
4,353,427 A * 10/1982 Stock ..................... G01G 11/10
73/1.13
(Continued)

FOREIGN PATENT DOCUMENTS

CN 107014475 A 8/2017

*Primary Examiner* — Randy W Gibson
(74) *Attorney, Agent, or Firm* — Standley Law Group LLP; Jeffrey S. Standley; Adam J. Smith (57) ABSTRACT

Accurate weighing and measurement of fine materials is provided by a linear compensation apparatus and a weighing system. The linear compensation apparatus has a weight loading mechanism (10) with a bearing plate (11), a drive apparatus (12), and a measuring weight (13). The drive apparatus is mounted onto the bearing plate, the measuring weight is connected to the drive apparatus, and, by hoisting or lowering the measuring weight with the drive apparatus, loads from the bearing plate are adjusted. The linear compensation apparatus and the weighing system greatly reduce device costs and labor costs in a batching process, save time and effort, have no risk of cross-contamination, and achieve automated production operation.

17 Claims, 10 Drawing Sheets

(56) References Cited

U.S. PATENT DOCUMENTS

| | | | |
|---|---|---|---|
| 4,466,500 A | 8/1984 | Mosher et al. | |
| 4,932,486 A * | 6/1990 | Komoto | G01G 23/012 |
| | | | 73/1.13 |
| 5,191,543 A * | 3/1993 | Berthel | G01G 23/012 |
| | | | 702/101 |
| 9,523,604 B2 | 12/2016 | Fankhauser et al. | |

* cited by examiner

LINEAR COMPENSATION APPARATUS AND WEIGHING SYSTEM FOR ACCURATE WEIGHING AND MEASUREMENT OF FINE MATERIALS

CROSS-REFERENCE TO RELATED APPLICATIONS

This application makes a claim of priority to Chinese application 202010923694.1, filed on 4 Sep. 2020, which is incorporated by reference as if fully recited herein.

TECHNICAL FIELD

The inventive concept relates to the field of batching and weighing, and in particular, to a linear compensation apparatus and a weighing system for accurate weighing and measurement of fine materials.

BACKGROUND ART

In the prior art, weighing modules are widely applied in various industries due to their advantages of having a compact structure, being easily integrated, providing accurate weighing, etc. A weighing module is usually integrated at the bottom of a load container (a material tank, a feed bin, a reaction kettle, etc.), and all the materials in the container are weighed by a weighing sensor inside the weighing module.

For food, pharmaceutical, fine chemical and other industries, it is required not only to weigh fine formulation materials, but also to measure relatively heavy reaction solvents in a batching process. Several parts of materials are finally agitated and mixed to complete the batching process. The accuracy of a tank scale is affected by the rigidity of process pipes, a material tank lug, and a base, and is also related to the severity of ambient temperature changes, and the degree of shaking of the feed bin caused by agitation inside the feed bin, external vibration, a shared base, and horizontal wind strength.

Accordingly, except for the process pipes, the impact of external factors on measurement performance of the module can be minimized by improving internal or external conditions of module installation, or adding auxiliary facilities. For process pipes of a batching system, such as a feed pipe, a discharge pipe, a heating pipe, and a washing pipe, some pipes are related to pressure and sealing, and rigid, pressure-resistant, and highly reliable process pipes need to be used. Throughout the weighing process, sinking of the base, deformation of the material tank lug, and normal deformation of the weighing module and the weighing sensor in the weighing process cause the pipes to exert an additional acting force in the vertical weighing direction of the feed bin. The strength of the acting force is not only related to moment of inertia, an overhang length, an elasticity modulus, but also related to the mounting direction.

Due to characteristics such as a large number of pipes, flexible and diverse mounting positions and directions, randomly varying additional acting forces, when fine materials are being batched and weighed at a batching point, the measurement accuracy is low and cannot meet process requirements. Therefore, a single tank scale cannot meet process requirements for batching fine materials in the above industries.

A common practice is to use a plurality of tank scales with different capacities. To be specific, a small-capacity tank scale or platform scale is used to weigh light fine formulation materials separately, then a large-capacity tank scale is used to weigh a heavy solvent material, and then one or more weighed fine materials and solvent materials are mixed to complete the batching process. Such a process method requires the configuration of a plurality of weighing devices, and at the same time, the method cannot achieve automation and has the disadvantages of high costs, low efficiency, a complicated process, etc.

In conclusion, the main factor that affects the accuracy of batching scale and the automation of operation lines are additional loads on the weighing system from external mechanical forces and process pipes.

In addition, for the above industries, as required by industry standards or national regulations (such as GMP and FDA), an adjustment at a short cycle (on a daily basis or once every few days) is required for tank scales for batching. A current practice is to adjust the scales by manually adding weights. This method consumes much time and effort, and there is a risk of cross-contamination, which is also a problem that needs to be solved.

In view of this, those skilled in the art develop a linear compensation apparatus and a weighing system for accurate weighing and measurement of fine materials to overcome the foregoing technical problems.

SUMMARY OF INVENTION

The technical problems addressed herein include the defects of high costs, low efficiency, and the complicated process in accurate weighing of fine materials in the prior art. To overcome these defects, the inventive concept provides a linear compensation apparatus and a weighing system for accurate weighing and measurement of fine materials.

The inventive concept solves the above technical problem by providing a linear compensation apparatus for accurate weighing and measurement of fine materials. The linear compensation apparatus comprises a weight loading mechanism, and the weight loading mechanism comprises a bearing plate, a drive apparatus, and a measuring weight. The drive apparatus is mounted onto the bearing plate, the measuring weight is connected to the drive apparatus, and the measuring weight is hoisted or lowered by the drive apparatus to apply loads to or reduce loads from the bearing plate.

In many embodiments, the drive apparatus comprises a hoisting drive mechanism and a hoisting rod, and the measuring weight is connected to a drive rod of the hoisting drive mechanism by means of the hoisting rod.

In some embodiments, the linear compensation apparatus further comprises a supporting plate. The bearing plate and the supporting plate are arranged opposite each other from up to down, with a loading area formed between them. The hoisting drive mechanism is vertically mounted onto a lower end face of the bearing plate, the measuring weight is on the supporting plate, and the hoisting drive mechanism drives the measuring weight to apply loads to the bearing plate.

In other embodiments, the linear compensation apparatus further comprises a supporting plate and the bearing plate and the supporting plate are arranged opposite each other from up to down, with a loading area formed them. However, the hoisting drive mechanism is vertically mounted onto an upper end face of the supporting plate, the measuring weight is above the hoisting drive mechanism, and the hoisting drive mechanism drives the measuring weight to apply loads to the bearing plate.

According to an embodiment of the inventive concept, a through hole is disposed in the middle of the measuring weight, and the hoisting rod passes through the through hole to connect to the drive rod of the drive apparatus.

According to an embodiment of the inventive concept, the lower end of the hoisting rod has a conical surface, a countersink is further disposed in the middle of the measuring weight, the through hole is above the countersink, the through hole communicates with the countersink, and the conical surface of the hoisting rod is positioned in the countersink.

According to an embodiment of the inventive concept, the hoisting drive mechanism may be a pneumatic cylinder mechanism, a hydraulic cylinder mechanism, an oil cylinder mechanism, or an electric cylinder mechanism.

According to an embodiment of the inventive concept, the hoisting drive mechanism is fastened onto the bearing plate with a screw.

According to an embodiment of the inventive concept, the drive apparatus is connected to a control system through a solenoid valve.

According to an embodiment of the inventive concept, the hoisting drive mechanism is mounted onto the bearing plate, and the measuring weight is horizontally moved relative to the hoisting drive mechanism, to apply loads to the bearing plate.

The inventive concept further provides a weighing system for accurate weighing and measurement of fine materials, wherein the weighing system comprises the linear compensation apparatus for accurate weighing and measurement of fine materials as described above and a main material weighing unit, wherein one end of the bearing plate is connected to a weighing top plate of the main material weighing unit, and one end of the supporting plate is connected to the bottom of the main material weighing unit.

According to an embodiment of the inventive concept, a gap is disposed at one end of the supporting plate, and the supporting plate is connected to the bottom of the main material weighing unit using a connecting bolt.

According to an embodiment of the inventive concept, the bearing plate is Z-shaped, and the supporting plate is Z-shaped.

According to an embodiment of the inventive concept, the bearing plate comprises a connecting portion and a bearing portion, the connecting portion is lower than the bearing portion, the connecting portion is connected to the weighing top plate of the main material weighing unit such that the weighing top plate is level with the bearing portion, and the drive apparatus is mounted onto the bearing portion.

According to an embodiment of the inventive concept, a vertical space and a horizontal space between the weighing top plate and the supporting plate are both larger than the maximum displacement of the linear compensation apparatus.

The inventive concept provides several positive and advanced effects. The linear compensation apparatus and the weighing system for accurate weighing and measurement of fine materials as disclosed can greatly reduce device costs and labor costs in a batching process, save time and effort, have no risk of cross-contamination, and achieve automated production operation.

The linear compensation apparatus for accurate weighing and measurement of fine materials has a simple structure, and is easy to process. The apparatus itself has few components, and only the bearing plate and the supporting plate need to be processed. The self-made components are easy to process, and the main processes are plate bending and wire cutting. The rest are standard components. Therefore, the total cost is low, and the apparatus has the advantages of high efficiency and low cost.

BRIEF DESCRIPTION OF THE DRAWINGS

The above and other features, properties and advantages of the inventive concept will become clearer based on the description below in conjunction with the accompanying drawings and embodiments, and the same features are always indicated by the same reference numerals in the figures, in which.

DESCRIPTION OF EMBODIMENTS

To make the above objects, features and advantages of the inventive concept more apparent and easier to understand, specific implementations of the inventive concept are described in detail below with reference to the accompanying drawings.

Embodiments of the inventive concept will now be described in detail with reference to the accompanying drawings. Reference will now be made in detail to preferred embodiments of the inventive concept, examples of which are illustrated in the accompanying drawings. The same reference numerals used in all the accompanying drawings denote identical or similar parts wherever possible.

Furthermore, although the terms used in the inventive concept are selected from well-known common terms, some of the terms mentioned in the description of the inventive concept may have been selected by the applicant according to his or her determination, and the detailed meaning thereof is described in the relevant section described herein.

Furthermore, the inventive concept must be understood, not simply by the actual terms used but also by the meanings encompassed by each term.

Embodiment 1

Figure 1:
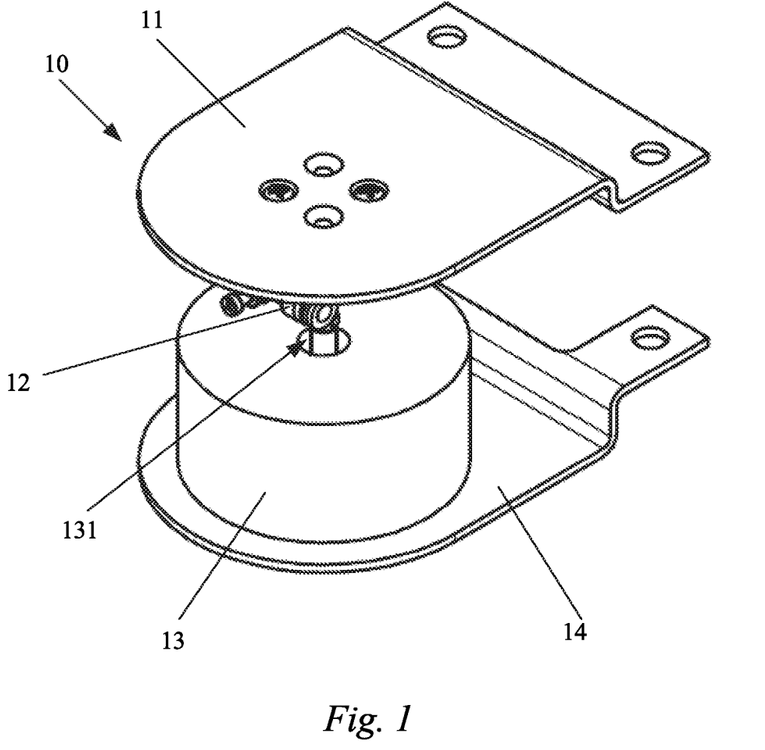
FIG. 1 is a perspective view of a first embodiment of a linear compensation apparatus for accurate weighing and measurement of fine materials according to the inventive concept.
Figure 2:
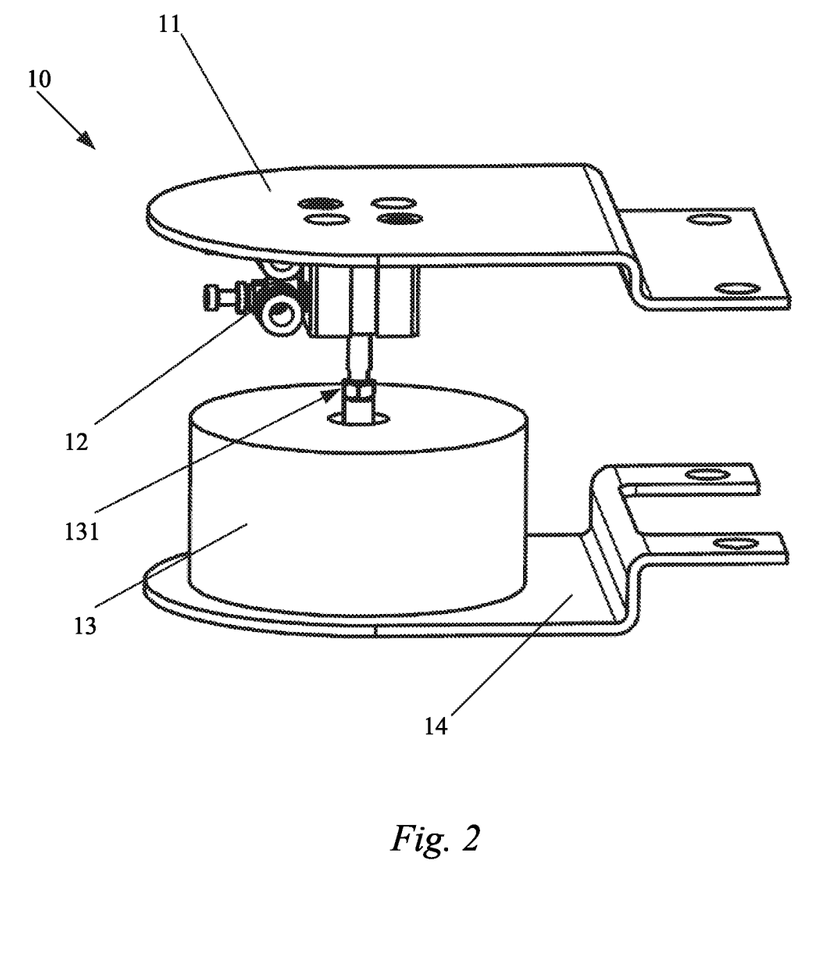
FIG. 2 is a front view of the FIG. 1 embodiment.
Figure 3:
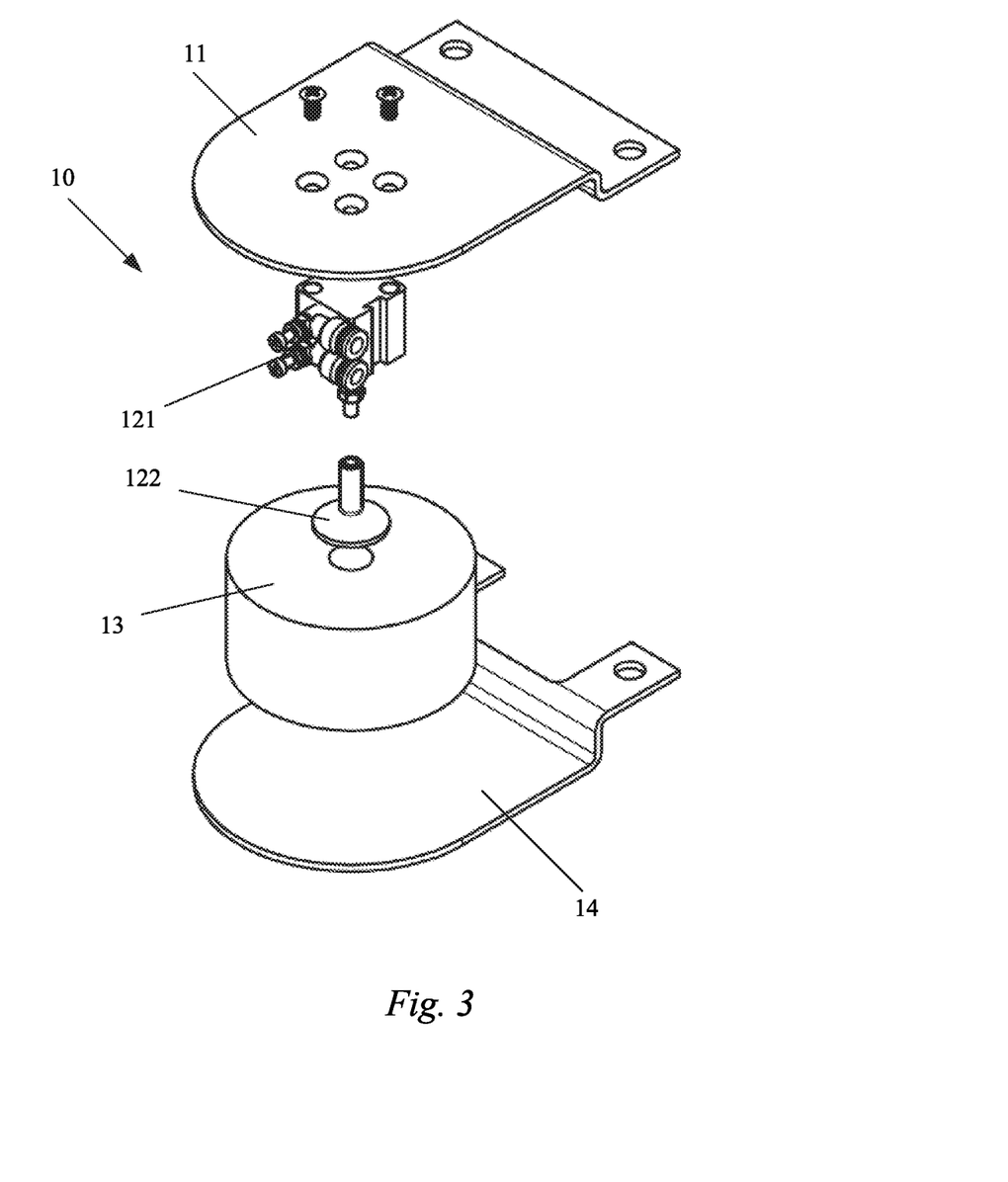
FIG. 3 is an exploded view of the FIG. 1 embodiment.

FIG. 1 is a perspective view of Embodiment 1 of a linear compensation apparatus for accurate weighing and measurement of fine materials according to the inventive concept. FIG. 2 is a front view of Embodiment 1 of a linear compensation apparatus for accurate weighing and measurement of fine materials according to the inventive concept. FIG. 3 is an exploded view of Embodiment 1 of a linear compensation apparatus for accurate weighing and measurement of fine materials according to the inventive concept.

As shown in FIG. 1 to FIG. 3, the inventive concept discloses a linear compensation apparatus for accurate weighing and measurement of fine materials. The linear compensation apparatus comprises a weight loading mechanism 10, and the weight loading mechanism 10 comprises a bearing plate 11, a drive apparatus 12, and a measuring weight 13, wherein the drive apparatus 12 is mounted onto the bearing plate 11, the measuring weight 13 is connected to the drive apparatus 12, and the measuring weight 13 is hoisted or lowered by the drive apparatus 12 to apply loads to or reduce loads from the bearing plate 11. The drive apparatus 12 preferably comprises a hoisting drive mechanism 121 and a hoisting rod 122, and the measuring weight 13 is connected to a drive rod of the hoisting drive mechanism 121 by means of the hoisting rod 122.

Preferably, the linear compensation apparatus further comprises a supporting plate 14, the bearing plate 11 and the supporting plate 14 are arranged opposite each other from up to down, the hoisting drive mechanism 121 is vertically mounted onto the lower end face of the bearing plate 11, the measuring weight 13 is on the supporting plate 14, and the hoisting drive mechanism 121 drives the measuring weight 13 to apply loads to the bearing plate 11.

Further, a through hole 131 is disposed in the middle of the measuring weight 13, and the hoisting rod 122 passes through the through hole 131 to connect to the drive rod of the drive apparatus 12.

Particularly, the lower end of the hoisting rod 122 has a conical surface, a countersink 132 is further disposed in the middle of the measuring weight 13, the through hole 131 is above the countersink 132, the through hole 131 communicates with the countersink 132, and the conical surface of the hoisting rod 122 is positioned in the countersink 132.

Preferably, the hoisting drive mechanism 121 may be a pneumatic cylinder mechanism, a hydraulic cylinder mechanism, an oil cylinder mechanism, or an electric cylinder mechanism. The hoisting drive mechanism 121 is fastened onto the bearing plate 11 with a screw 123.

In the foregoing structure, the linear compensation apparatus for accurate weighing and measurement of fine materials can be mounted in various types of weighing systems, which can greatly reduce device costs and labor costs in a batching process, save time and effort, have no risk of cross-contamination, and achieve automated production operation.

Figure 4:
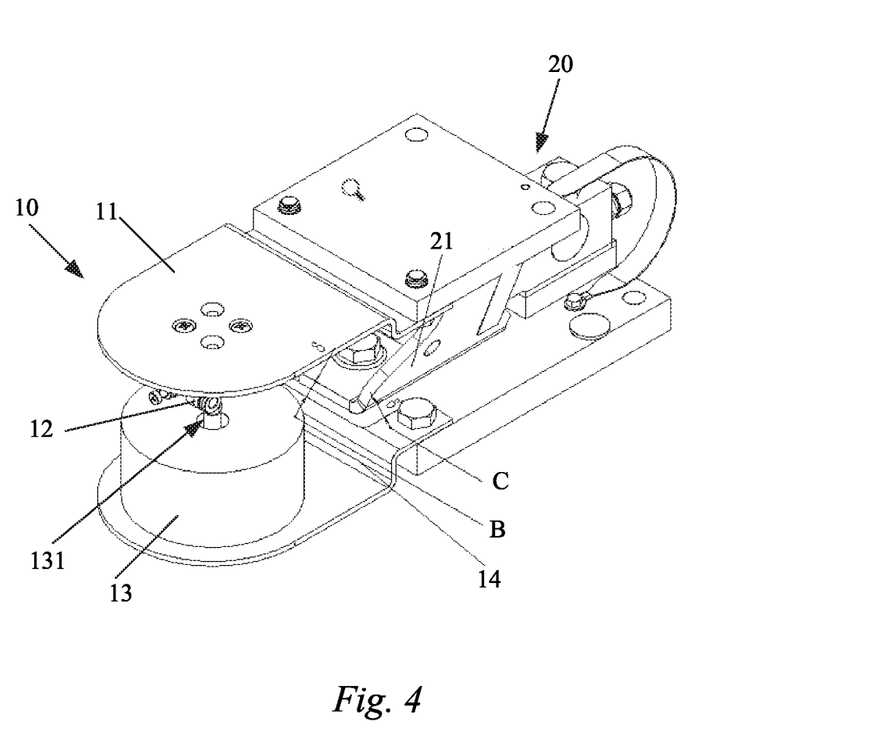
FIG. 4 is a perspective view of a first embodiment of a weighing system for accurate weighing and measurement of fine materials according to the inventive concept.
Figure 5:
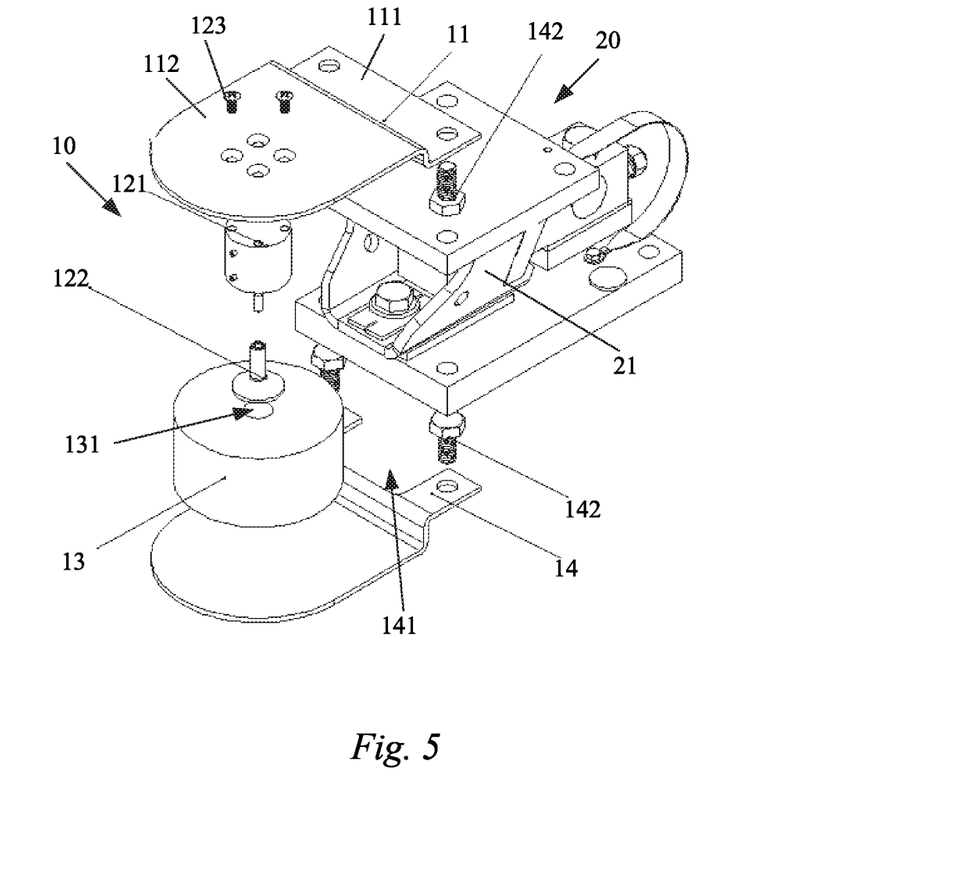
FIG. 5 is an exploded view of the FIG. 4 embodiment, in which a hydraulic compensation apparatus is used.
Figure 6:
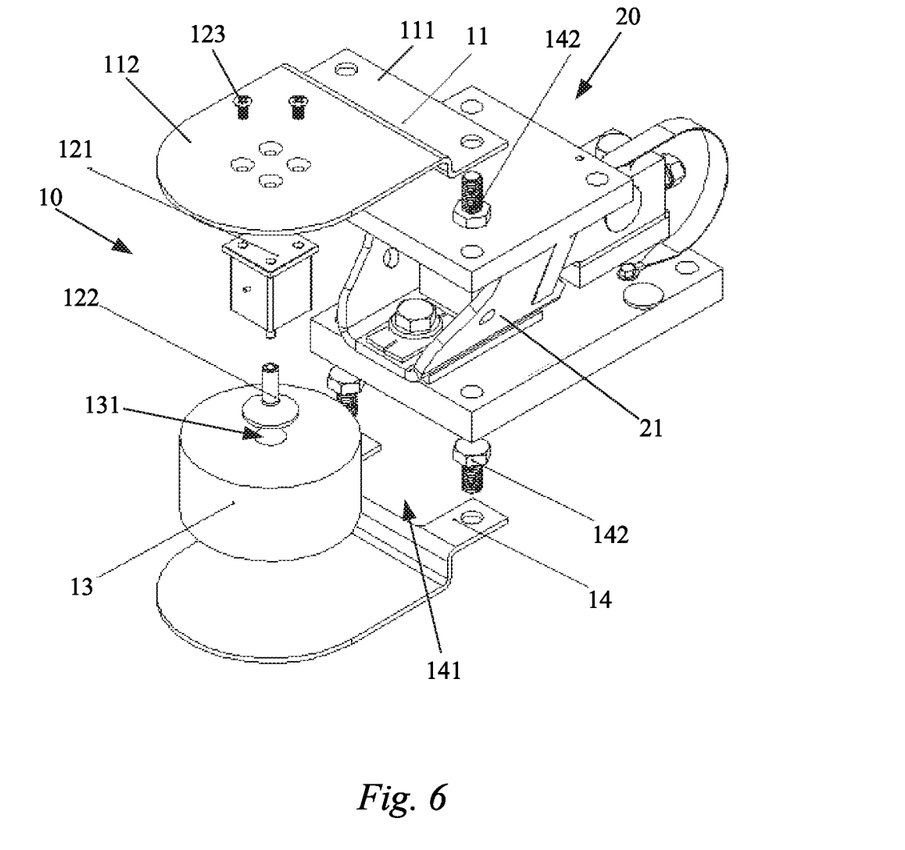
FIG. 6 is an exploded view of the FIG. 4 embodiment, in which an electric cylinder compensation apparatus is used.
Figure 7:
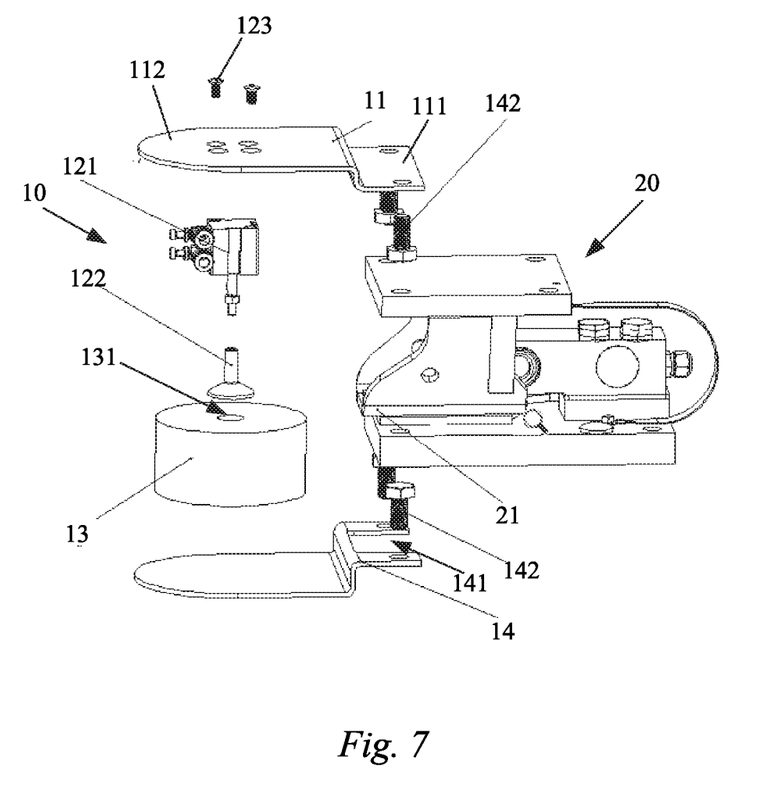
FIG. 7 is an exploded view of the FIG. 4 embodiment, in which a pneumatic cylinder compensation apparatus is used.
Figure 8:
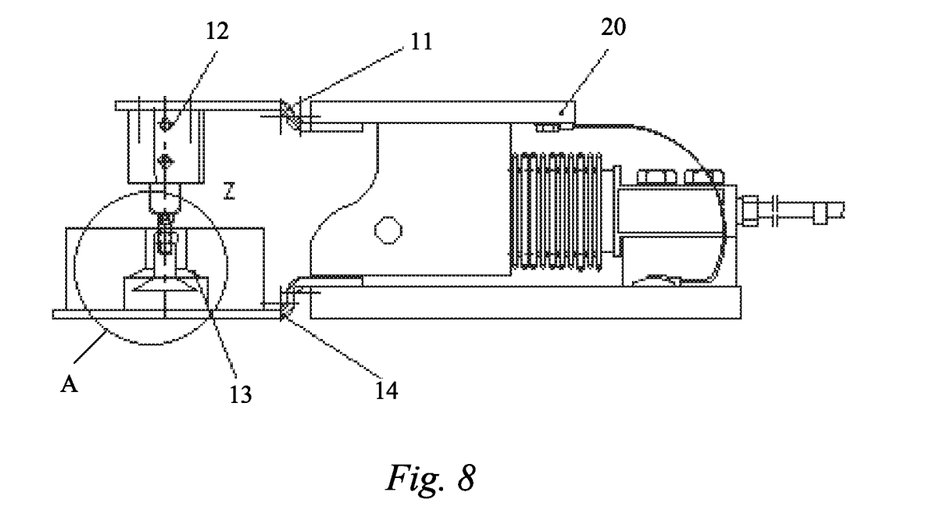
FIG. 8 is a front view of the FIG. 4 embodiment.
Figure 9:
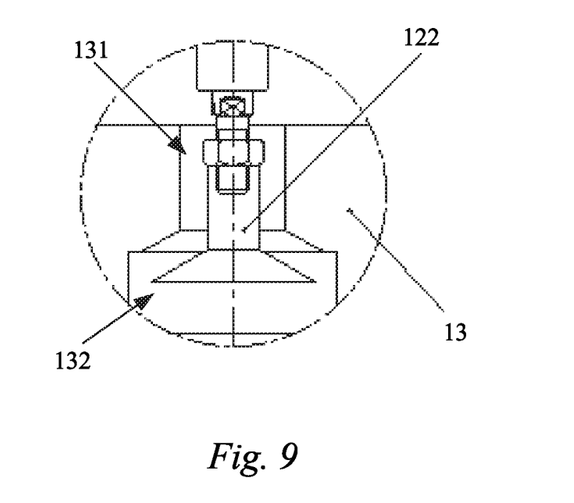
FIG. 9 is an enlarged view of a portion A of FIG. 8.

FIG. 4 is a perspective view of Embodiment 1 of a weighing system for accurate weighing and measurement of fine materials according to the inventive concept. FIG. 5 is an exploded view, in which a hydraulic compensation apparatus is used, of Embodiment 1 of a weighing system for accurate weighing and measurement of fine materials according to the inventive concept. FIG. 6 is an exploded view, in which an electric cylinder compensation apparatus is used, of Embodiment 1 of a weighing system for accurate weighing and measurement of fine materials according to the inventive concept. FIG. 7 is an exploded view, in which a pneumatic cylinder compensation apparatus is used, of Embodiment 1 of a weighing system for accurate weighing and measurement of fine materials according to the inventive concept. FIG. 8 is a front view of Embodiment 1 of a weighing system for accurate weighing and measurement of fine materials according to the inventive concept. FIG. 9 is an enlarged view of a portion A in FIG. 8.

As shown in FIG. 4 to FIG. 9, the inventive concept discloses a weighing system for accurate weighing and measurement of fine materials, and the weighing system comprises a linear compensation apparatus for accurate weighing and measurement of fine materials and a main material weighing unit 20. The linear compensation apparatus for accurate weighing and measurement of fine materials comprises a weight loading mechanism 10, and the weight loading mechanism 10 comprises a bearing plate 11, a drive apparatus 12, a measuring weight 13, and a supporting plate 14, wherein one end of the bearing plate 11 is connected to a weighing top plate 21 of the main material weighing unit 20, one end of the supporting plate 14 is connected to the bottom of the main material weighing unit 20, and the bearing plate 11 and the supporting plate 14 are arranged opposite each other from up to down, forming a loading area A. The drive apparatus 12 is vertically mounted onto the lower end face of the bearing plate 11, the measuring weight 13 is on the supporting plate 14, the measuring weight 13 is connected to the drive apparatus 12 in the loading area A, and the measuring weight 13 is hoisted or lowered by the drive apparatus 12 to apply loads to or reduce loads from the bearing plate 11.

Preferably, the drive apparatus 12 comprises a hoisting drive mechanism 121 and a hoisting rod 122, and the measuring weight 13 is connected to a drive rod of the hoisting drive mechanism 121 by means of the hoisting rod 122.

Further, a through hole 131 is disposed in the middle of the measuring weight 13, and the hoisting rod 122 passes through the through hole 131 to connect to the drive rod of the drive apparatus 12.

Particularly, the lower end of the hoisting rod 122 has a conical surface, a countersink 132 is further disposed in the middle of the measuring weight 13, the through hole 131 is above the countersink 132, the through hole 131 communicates with the countersink 132, and the conical surface of the hoisting rod 122 is positioned in the countersink 132.

Preferably, the hoisting drive mechanism 121 may be a pneumatic cylinder mechanism, a hydraulic cylinder mechanism, an oil cylinder mechanism, or an electric cylinder mechanism. The hoisting drive mechanism 121 is fastened onto the bearing plate 11 with a screw 123.

Additionally, a gap 141 is disposed at one end of the supporting plate 14, and the supporting plate is connected to the bottom of the main material weighing unit 20 using a connecting bolt 142. The bearing plate 11 is preferably Z-shaped, and the supporting plate 14 is preferably Z-shaped.

Particularly, the bearing plate 11 preferably comprises a connecting portion 111 and a bearing portion 112, wherein the connecting portion 111 is lower than the bearing portion 112. The connecting portion 111 is connected to the weighing top plate 21 of the main material weighing unit 20 using the connecting bolt 142 such that the weighing top plate 21 is level with the bearing portion 112, and the drive apparatus 12 is mounted onto the bearing portion 112.

A vertical space B and a horizontal space C between the weighing top plate 21 and the supporting plate 14 are both larger than the maximum displacement of the linear compensation apparatus. The drive apparatus 12 is connected to a control system using a solenoid valve (not shown in the figures).

According to the foregoing structural description, the linear compensation apparatus for accurate weighing and measurement of fine materials in the inventive concept integrates a weight loading and unloading mechanism and a main material weighing unit, wherein the weight loading and unloading apparatus mainly comprises: a bearing plate, a drive apparatus, a supporting plate, and a weight, wherein the drive apparatus mainly comprises a set of hoisting drive mechanism and a hoisting rod. There is a plurality of possible implementations for the hoisting drive mechanism: a pneumatic cylinder mechanism (a pneumatic compensation apparatus shown in FIG. 4), an hydraulic cylinder mechanism (a hydraulic compensation apparatus shown in FIG. 2), an electric cylinder mechanism (an electric compensation apparatus shown in FIG. 3), etc.

This embodiment takes a solution of an existing weighing module integrated with an accessory as an example, and takes a pneumatic cylinder hoisting solution as an example. Since most customer sites are equipped with compressed air, mounting and application can be implemented through connection of a flexible pipe. A weight loading method may be hoisting or lifting. If it is a hoisting mode, a reading output by a meter does not comprise the weight of a weight before loading and calibration are initiated, and the weight is static on a base supporting plate.

When tiny calibration is required, a master computer issues instructions, a hoisting apparatus hoists the weight and loads it into the main material weighing unit, and the weight is combined for display on the meter. If it is a lifting mode, the weight has been lifted at first. After the hoisting apparatus receives instructions, the lifting mechanism moves downward to hang the weight on a hoisting rod. A brand new integrated design solution and other hoisting or lifting methods are similar to the solution in this specification, and details are not described herein.

The operating principle of the linear compensation apparatus for accurate weighing and measurement of fine materials in the inventive concept is as follows: an upper bearing plate of the linear compensation apparatus is connected to a top plate of an existing weighing module using a mounting screw, the mounting screw is further configured to mount the weighing module and lugs or legs of a weighing bin, a lower supporting plate is rigidly connected to a base or a module baseplate, and for a hoisting (pneumatic, hydraulic, or electric) apparatus in the middle, one end is connected to the upper bearing plate, and the other end hoists or lowers the weight by means of the hoisting rod, to apply loads to or reduce loads from the weighing system. The overall structure of the linear compensation apparatus is simple, comprising only the several above-mentioned components, and is convenient to manufacture. The upper bearing plate and the lower supporting plate are bent plates, and others are standard components.

The linear compensation apparatus can be easily mounted, with mounting holes organically combined with mounting holes of the top plate of the existing module. The linear compensation apparatus can not only be mounted in a new weighing module system, but also can be used to reform the original weighing module system. A signal is transmitted to the hoisting device, and automation can be easily achieved. Another tiny calibration with the weight not only improves the accuracy of the tiny weighing, but also saves the cost of an additional weighing instrument, and avoids error accumulation of the additional weighing instrument. Through calibration and weighing by a set of apparatus, the non-linear impact on pipes of the system are compensated, and the linear measurement accuracy of the batching point is improved.

The linear compensation apparatus for accurate weighing and measurement of fine materials in the inventive concept, as an accessory of the existing weighing unit, may be integrated with an existing module, or a brand new module design may be integrated with a linear compensation apparatus, to perform secondary linear calibration for a batching point, which effectively compensates for the impact on the weighing accuracy of the pipes, and reduces linear errors when fine materials are weighted at the batching point.

A linear compensation apparatus is at a batching point for fine material. A meter and a PLC master computer issue loading or unloading instructions to a weighing system, a weighing unit, and the linear compensation apparatus, and use an accessory or a component of the weighing unit (a weight loading or unloading apparatus is added or integrated on the weighing unit), to implement independent loading and unloading or combined loading and unloading on each weighing unit of the weighing system. After a signal output by a sensor is integrated, a terminal box or a digital sensor directly communicates with the weighing meter to implement secondary multiple-point calibration or two-point linear calibration in a small range for the batching point of the weighing system, thereby compensating for the impact on the weighing system of process pipes of a material tank.

Figure 10:
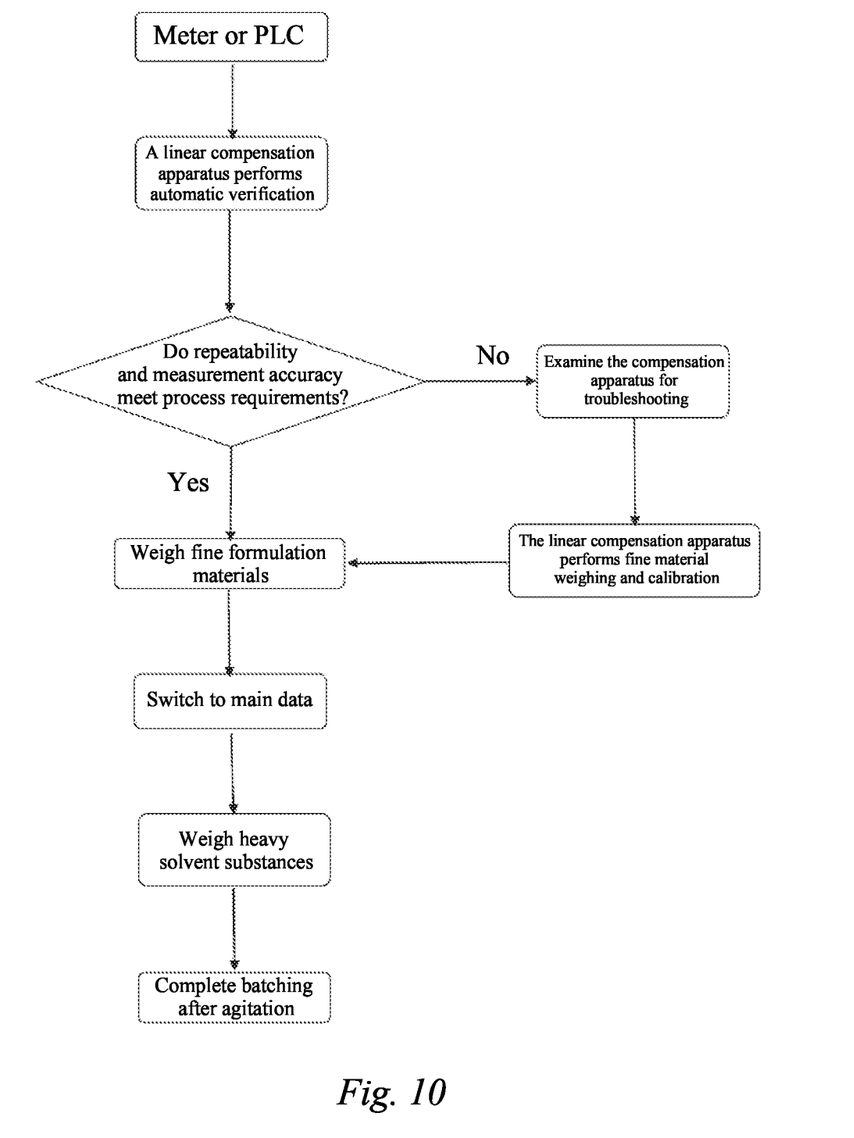
FIG. 10 is a flowchart of batching of a weighing system for accurate weighing and measurement of fine materials according to the inventive concept.

FIG. 10 is a flowchart of batching of a weighing system for accurate weighing and measurement of fine materials according to the inventive concept.

As shown in FIG. 10, a batching process of the linear compensation apparatus for accurate weighing and measurement of fine materials in the inventive concept is as follows:
  step 1: a meter of the weighing system or a PLC issues a linear compensation automatic verification instruction, the fine material weighing system is in an initial state at this time, a hoisting rod is separate from a weight, the weight is on a base supporting plate and separate from the weighing system, the meter and the PLC are at zero by default, and components involved are a bearing plate, a drive apparatus, a conical-surface hoisting rod, a measuring weight, and a supporting plate;
  step 2: the drive apparatus hoists the weight, the weight is separate from the supporting plate, loads are applied to the weighing system, the meter or the PLC performs linear correction for the formulation material weighing system to compensate for impact of process pipes or other mechanical structures, and components involved are the bearing plate, the drive apparatus, the conical-surface hoisting rod, and the measuring weight;
  step 3: the hoisting rod lowers the weight (the hoisting rod is separate from the weight), the weight falls onto the base supporting plate and separate from the weighing system, and components involved are the bearing plate, the drive apparatus, the conical-surface hoisting rod, the measuring weight, and the supporting plate; and
  step 4: formulation and material addition are performed.

Embodiment 2

Figure 11:
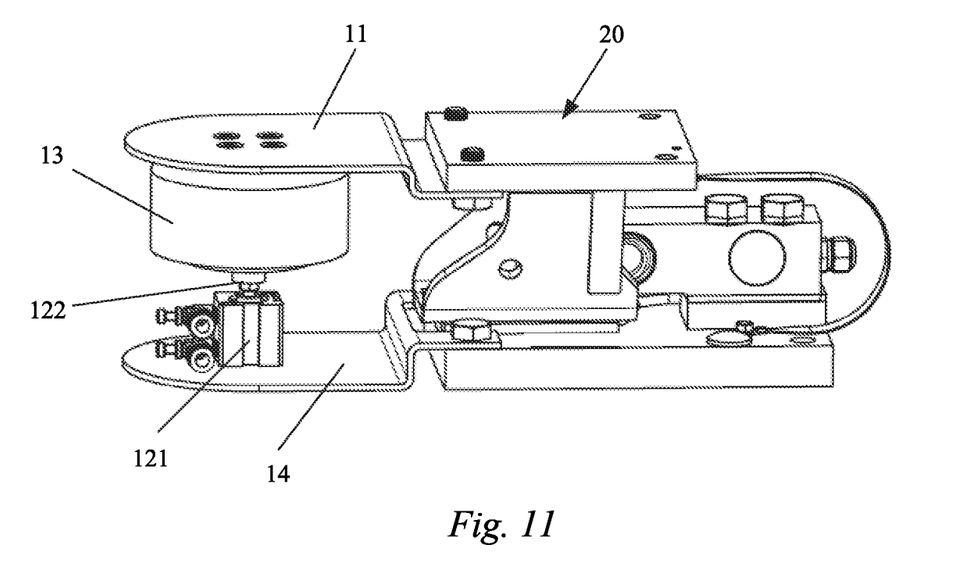
FIG. 11 is a perspective view of a second embodiment of a weighing system for accurate weighing and measurement of fine materials according to the inventive concept.

FIG. 11 is a perspective view of Embodiment 2 of a weighing system for accurate weighing and measurement of fine materials according to the inventive concept.

As shown in FIG. 11, the structure of this embodiment is basically the same as Embodiment 1, except that: the online linear compensation apparatus for accurate weighing and measurement of fine materials comprises a weight loading mechanism 10, and the weight loading mechanism 10 comprises a bearing plate 11, a drive apparatus 12, a measuring weight 13, and a supporting plate 14, wherein one end of the bearing plate 11 is connected to a weighing top plate 21 of a main material weighing unit 20, one end of the supporting plate 14 is connected to the bottom of the main material weighing unit 20, and the bearing plate 11 and the supporting plate 14 are arranged opposite each other from up to down, forming a loading area A.

The drive apparatus 12 comprises a hoisting drive mechanism 121 and a hoisting rod 122, and the measuring weight 13 is connected to a drive rod of the hoisting drive mechanism 121 by means of the hoisting rod 122. The hoisting drive mechanism 121 is vertically mounted onto the upper end face of the supporting plate 14, the measuring weight 13 is above the hoisting drive mechanism 121, and the hoisting drive mechanism 121 drives the measuring weight 13 to apply loads to the bearing plate 11.

In this embodiment, when the hoisting drive mechanism 121 lifts the measuring weight 13 up to the bearing plate 11 in the vertical direction, loads are applied to the bearing plate 11, and therefore loads are applied to the main material weighing unit 20. When the hoisting drive mechanism 121 lowers the measuring weight 13 down away from the bearing plate 11 in the vertical direction, loads are reduced from the bearing plate 11, and therefore loads are reduced from the main material weighing unit 20.

Embodiment 3

Figure 12:
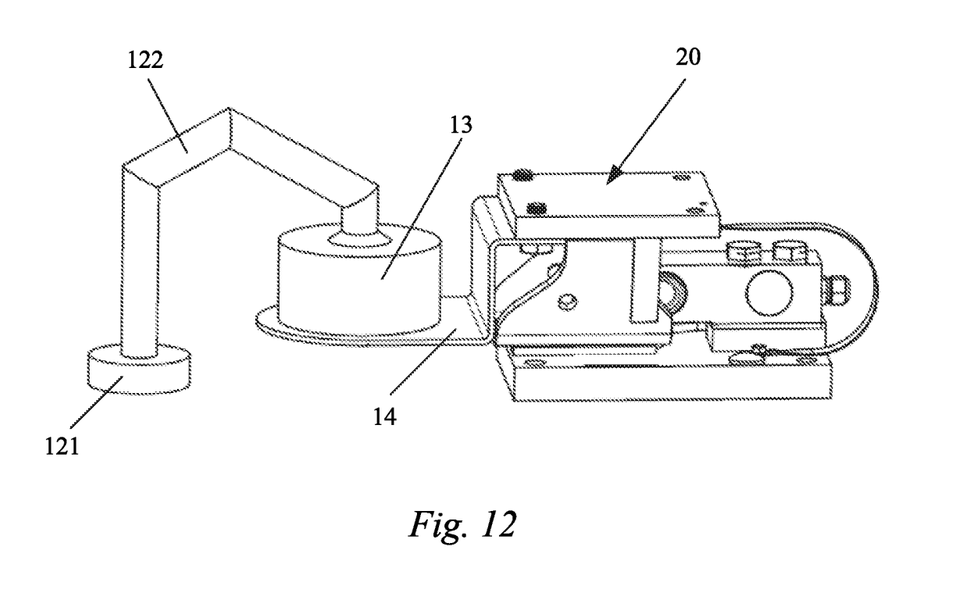
FIG. 12 is a perspective view of a third embodiment of a weighing system for accurate weighing and measurement of fine materials according to the inventive concept.

FIG. 12 is a perspective view of Embodiment 3 of a weighing system for accurate weighing and measurement of fine materials according to the inventive concept.

As shown in FIG. 12, the structure of this embodiment is basically the same as Embodiment 1, except that: a weight loading mechanism 10 comprises a bearing plate 11, a drive apparatus 12, a measuring weight 13, and one end of the bearing plate 11 is connected to a weighing top plate 21 of a main material weighing unit 20.

The drive apparatus 12 comprises a hoisting drive mechanism 121 and a hoisting rod 122, and the measuring weight 13 is connected to a drive rod of the hoisting drive mechanism 121 by means of the hoisting rod 122. The hoisting drive mechanism 121 is mounted onto the bearing plate 11, and the measuring weight 13 is horizontally moved relative to the hoisting drive mechanism 121, to apply loads to the bearing plate 11.

In this embodiment, when the hoisting drive mechanism 121 moves the measuring weight 13 onto the bearing plate 11 in the horizontal direction, loads are applied to the bearing plate 11, and therefore loads are applied to the main material weighing unit 20. When the hoisting drive mechanism 121 moves the measuring weight 13 away from the bearing plate 11 in the horizontal direction, loads are reduced from the bearing plate 11, and therefore loads are reduced from the main material weighing unit 20.

According to the descriptions of Embodiment 1, Embodiment 2, and Embodiment 3, the linear compensation apparatus for accurate weighing and measurement of fine materials have the following advantages:

1. Weight loading and unloading actions are completed by a solenoid valve controlling a vertical hoisting apparatus, and the solenoid valve receives a control signal from the meter or the PLC master computer system. Therefore, the mechanism easily implements automation control and remote control;
2. The apparatus has a compact structure, the mounting height is the same as the height of the weighing unit, and the mounting hole seamlessly matches the mounting hole of the weighing module. Therefore, additional mounting space and dedicated interfaces are not required, and the apparatus can be integrated with the existing weighing module as a whole;
3. The apparatus has a modular design. The apparatus can be integrated with the weighing module, or can be added and reformed on the existing weighing module;
4. The apparatus can receive the signal from the PLC master computer to perform automatic loading and unloading with no manual intervention on site required, which avoids human using an additional weighing apparatus for weighing and an additional weight for calibration on site;
5. The weight loading method may be hoisting, lifting, or many other methods;
6. The weight and the hoisting rod use the conical surface for cooperation, such that the weight is automatically aligned in the hoisting process, which greatly improves the calibration accuracy of the weight (as shown in FIG. 5);
7. The apparatus has a simple structure, and is easy to process. The apparatus itself has few components, and only the bearing plate and the supporting plate need to be processed. The self-made components are easy to process, and the main processes are plate bending and wire cutting. The rest are standard components. Therefore, the total cost is low, and the apparatus has the advantages of high efficiency and low cost;
8. The mechanism is independent, and has no impact on the accuracy of the weighing module of the main weighing system. For example, to avoid affecting the weighing and anti-overturn functions of the main weighing module, a gap is designed on the supporting plate, which perfectly avoids the interference with the top plate of the main weighing module (As shown in FIG. 4, the gap is disposed on the supporting plate to avoid possible interference from the weighing top plate. As shown in FIG. 1, the vertical space B and the horizontal space C between the weighing top plate and the supporting plate are both greater than the maximum displacement designed by the module);
9. The implementations are diverse. The vertical hoisting device of the weight may be a pneumatic cylinder, an oil cylinder, an electric push rod, or may be other electric or pneumatic vertical lifting element;
10. The protection of no ingress of dust can be achieved by providing a protective apparatus, such as a rubber soft sleeve and a labyrinth sealing apparatus, and the accuracy can be further improved;
11. The apparatus may not only be used as a standard product, but also may be used to reform the original device, because mounting screw holes are exactly the same as those of the original weighing main system in size. In addition, since the bearing plate and the supporting plate are thin, there is no need to add additional mounting screws during mounting, and the original mounting screws of the weighing module are sufficient.

In conclusion, the linear compensation apparatus for accurate weighing and measurement of fine materials in the inventive concept can greatly reduce device costs and labor costs in a batching process, save time and effort, have no risk of cross-contamination, and achieve automated production operation.

The linear compensation apparatus for accurate weighing and measurement of fine materials has a simple structure, and is easy to process. The apparatus itself has few components, and only the bearing plate and the supporting plate need to be processed. The self-made components are easy to process, and the main processes are plate bending and wire cutting. The rest are standard components. Therefore, the total cost is low, and the apparatus has the advantages of high efficiency and low cost.

Although specific implementations of the inventive concept have been described above, those skilled in the art should understand that these are merely examples, and the scope of protection of the inventive concept is defined by the appended claims. Various alterations or modifications to these implementations can be made by those skilled in the art without departing from the principle and essence of the inventive concept. However, these alterations and modifications all fall within the scope of protection of the inventive concept.

REFERENCE SIGNS LIST

Weight loading mechanism
Main material weighing unit
11 Bearing plate
12 Drive apparatus
13 Measuring weight
14 Supporting plate
21 Weighing top plate
121 Hoisting drive mechanism
122 Hoisting rod
131 Through hole
132 Countersink
123 Screw
141 Gap
142 Connecting bolt
111 Connecting portion
112 Bearing portion
A Loading area
B Vertical space
C Horizontal space

What is claimed is:

1. A linear compensation apparatus for accurate weighing and measuring of fine materials, having a weight loading mechanism that comprises:
a bearing plate;
a drive apparatus, mounted onto the bearing plate; and
a measuring weight, for applying loads to, or reducing loads from, the bearing plate, by being hoisted or lowered by the drive apparatus.

2. The linear compensation apparatus of claim 1, wherein the drive apparatus further comprises:
a hoisting drive mechanism having a drive rod; and
a hoisting rod that connects the the measuring weight to the hoisting drive mechanism through the drive rod.

3. The linear compensation apparatus of claim 2, further comprising:
a supporting plate, arranged opposite to and below the bearing plate, forming a a loading area between the bearing plate and the supporting plate, with the measuring weight on the supporting plate;
wherein the hoisting drive mechanism is vertically mounted on a lower end face of the bearing plate to drive the measuring weight for applying loads to the bearing plate.

4. The linear compensation apparatus of claim 2, further comprising:

a supporting plate, arranged opposite to and below the bearing plate, forming a loading area between the bearing plate and the loading plate; and
wherein the hoisting drive mechanism is vertically mounted on an upper end face of the supporting plate to drive the measuring weight, which is located above the hoisting drive mechanism, for applying loads to the bearing plate.

5. The linear compensation apparatus of claim 3, wherein:
a middle of the measuring weight has a through hole disposed therein, such that the hoisting rod connects to the drive rod of the drive apparatus by passing through the through hole.

6. The linear compensation apparatus of claim 5, wherein:
a lower end of the hoisting rod has a conical surface; and
the middle of the measuring weight has a countersink disposed therein, the countersink being below the through hole and in communication therewith;
wherein the conical surface of the hoisting rod is positioned in the countersink.

7. The linear compensation apparatus of claim 2, wherein the hoisting drive mechanism is a cylinder mechanism driven pneumatically, hydraulically, by oil or by electricity.

8. The linear compensation apparatus of claim 2, further comprising:
a screw that fastens the hoisting drive mechanism onto the bearing plate.

9. The linear compensation apparatus of claim 1, further comprising:
a solenoid valve that connects the drive apparatus to a control system.

10. The linear compensation apparatus of claim 2, wherein:
the hoisting drive mechanism is mounted onto the bearing plate; and
the measuring weight applies loads to the bearing plate by moving horizontally relative to the hoisting drive mechanism.

11. The linear compensation apparatus of claim 4, wherein:
a middle of the measuring weight has a through hole disposed therein, such that the hoisting rod connects to the drive rod of the drive apparatus by passing through the through hole.

12. The linear compensation apparatus of claim 5, wherein:
a lower end of the hoisting rod has a conical surface; and
the middle of the measuring weight has a countersink disposed therein, the countersink being below the through hole and in communication therewith;
wherein the conical surface of the hoisting rod is positioned in the countersink.

13. A weighing system for accurate weighing and measuring of fine materials, comprising:
a linear compensation apparatus, according to claim 1, having a bearing plate and a supporting plate; and
a main material weighing unit, having a weighing top plate that is connected to an end of the bearing plate and a bottom of the main material weighing unit that is connected to an end of the supporting plate.

14. The weighing system of claim 13, wherein:
a connecting bolt connects the supporting plate to the bottom of the main material weighing unit; and
the supporting plate has a gap disposed at one end thereof.

15. The weighing system of claim 13, wherein:
the bearing plate and the supporting plate are each Z-shaped.

16. The weighing system of claim 15, wherein the bearing plate further comprises:
- a bearing portion onto which the drive apparatus of the linear compensation apparatus is mounted; and
- a connecting portion that connected to the weighing top plate such that the weighing top plate is level with the bearing portion and the connecting portion is positioned lower than the bearing portion.

17. The weighing system of claim 16, wherein:
- the linear compensation apparatus has a maximum displacement that is less than a vertical space and a horizontal space between the weighing top plate and the supporting plate.

* * * * *

UNITED STATES PATENT AND TRADEMARK OFFICE
CERTIFICATE OF CORRECTION

PATENT NO. : 11,885,666 B2
APPLICATION NO. : 17/446788
DATED : January 30, 2024
INVENTOR(S) : Cai et al.

Page 1 of 1

It is certified that error appears in the above-identified patent and that said Letters Patent is hereby corrected as shown below:

In the Specification

In Column 11, Line 23, please insert -- 10 -- before "Weight loading mechanism".

In Column 11, Line 24, please insert -- 20 -- before "Main material weighing unit".

Signed and Sealed this
Twenty-third Day of April, 2024

Katherine Kelly Vidal
*Director of the United States Patent and Trademark Office*